United States Patent

[11] 3,620,350

| [72] | Inventor | Edward E. Cheek<br>Cleveland Heights, Ohio |
|---|---|---|
| [21] | Appl. No. | 884,172 |
| [22] | Filed | Dec. 11, 1969 |
| [45] | Patented | Nov. 16, 1971 |
| [73] | Assignee | McDowell-Wellman Engineering Company<br>Cleveland, Ohio |

[54] BULK MATERIAL FLOW CONTROL APPARATUS
5 Claims, 11 Drawing Figs.

| [52] | U.S. Cl. | 198/102, 198/205 |
|---|---|---|
| [51] | Int. Cl. | B65g 15/60 |
| [50] | Field of Search | 198/81, 102, 168, 169, 205; 285/352 |

[56] References Cited
UNITED STATES PATENTS

| 2,311,747 | 2/1943 | Gooch | 198/66 |
| 2,776,741 | 1/1957 | Carreer | 198/205 |
| 2,816,782 | 12/1957 | Anderson | 285/352 |
| 3,346,092 | 10/1967 | Bowden | 198/205 |

*Primary Examiner*—Richard E. Aegerter
*Attorney*—McNenny, Farrington, Pearne & Gordon

ABSTRACT: There is provided a flow control apparatus for use in conjunction with bulk material stacking and reclaiming apparatus. These devices are installed on the proximal extremity of a stacker-reclaimer boom and include a shroud extending at least partly around the tail sprocket, an opening for the discharge of bulk material as on reclaiming, and a gate or door for selectively closing and opening the material discharge opening.

INVENTOR
EDWARD E. CHEEK

McNenny, Farrington, Pearne & Gordon
ATTORNEYS

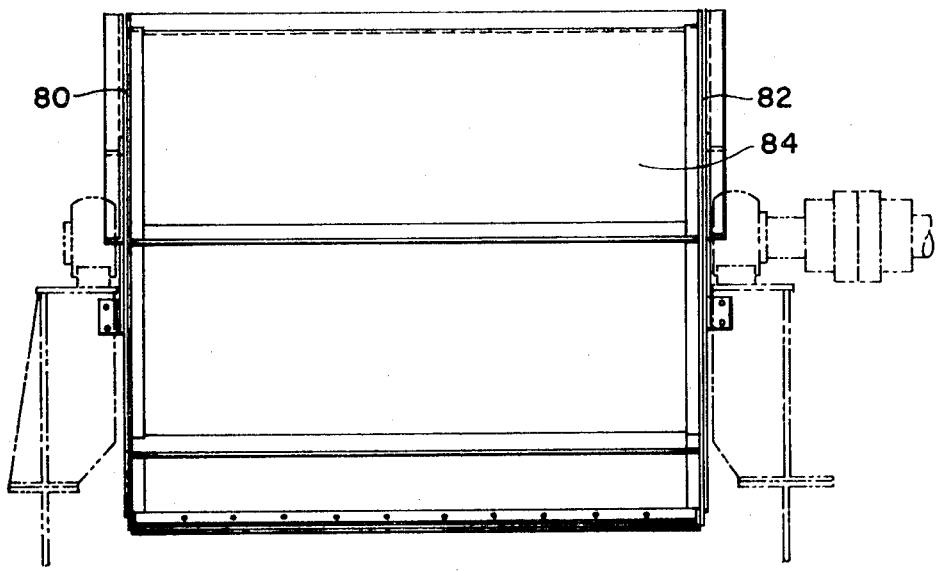
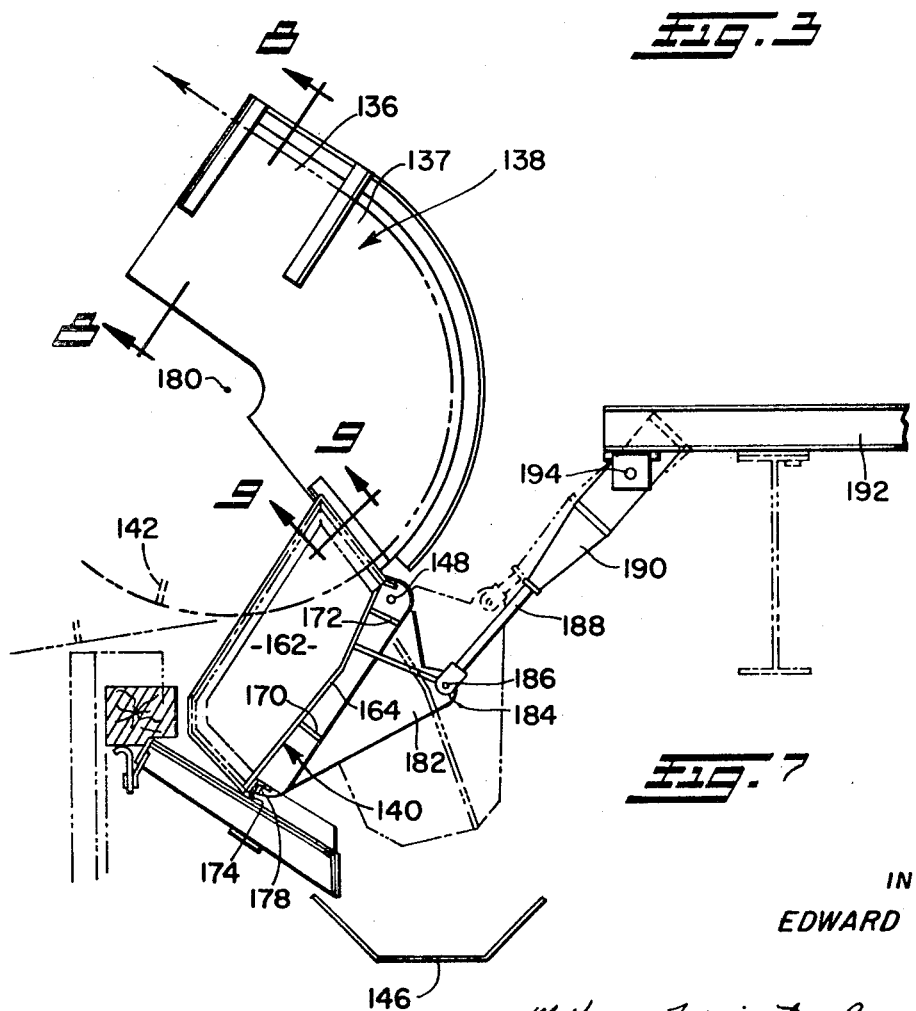

INVENTOR
EDWARD E. CHEEK

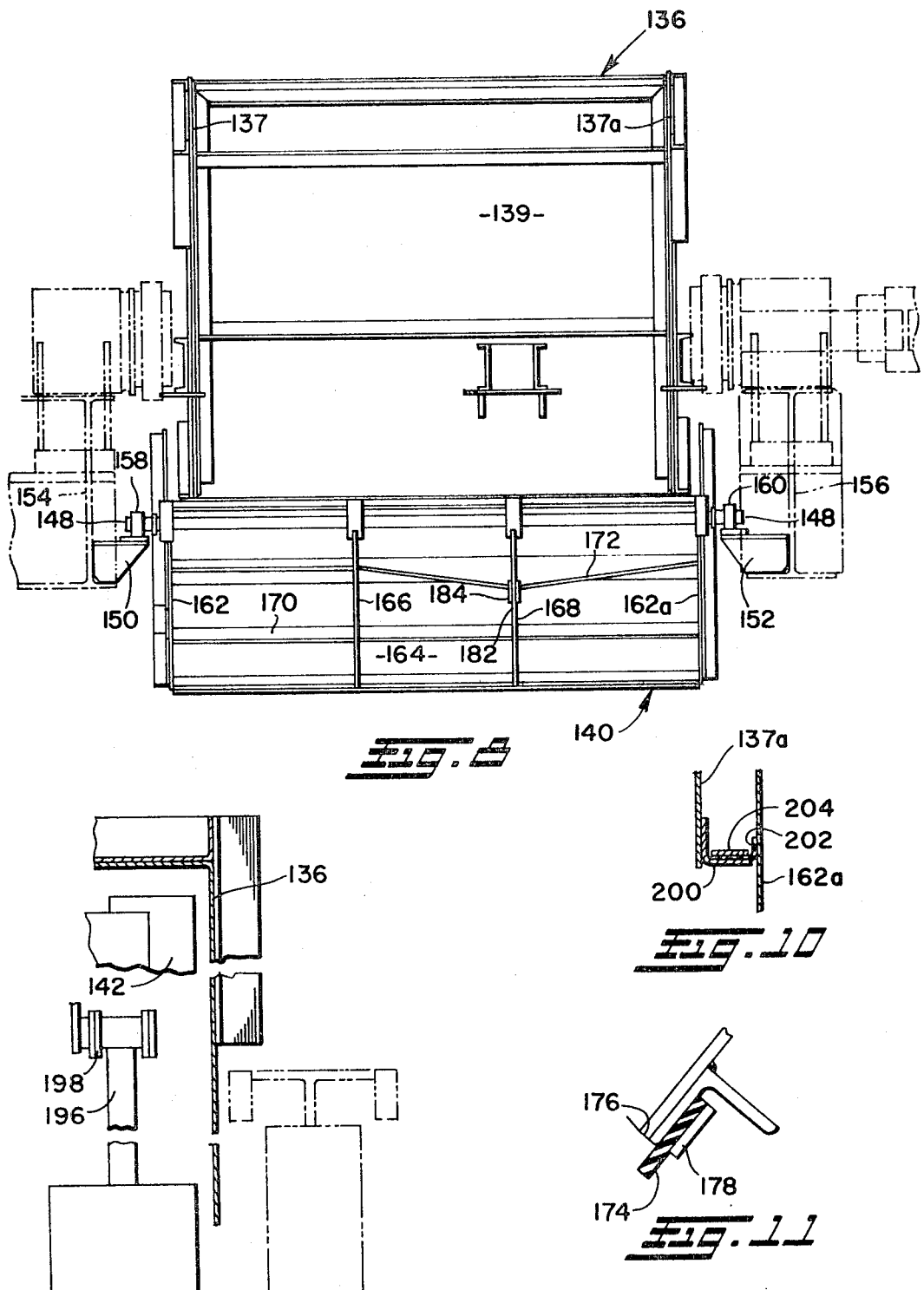

BULK MATERIAL FLOW CONTROL APPARATUS

BACKGROUND OF THE DISCLOSURE AND PRIOR ART

Bulk-material-handling apparatus is now available which is capable of performing the operations of stacking bulk material from a stack or pile thereof. This apparatus is characterized by a plurality of spaced material lifting or ranking flights carried on separate, laterally spaced endless chains in turn mounted on a boom having direction-reversing sprockets at end of the boom, one of which is a drive sprocket connected to a motor. Underlying the flights along the upper reach of the boom is an endless conveyor belt having direction-reversing pulleys one of which desirably rotates on the same axis as the sprocket for driving the flight-carrying chains and located in the proximal extremity of the boom. The upper reach of the conveyor belt is generally shorter than the upper reach of the flight carrying chains so that the distal extremity direction-changing means for the flight-carrying chains and the direction-changing pulley or roller for the conveyor belt are mounted on different axes spaced apart and adjacent the outer or distal extremity. During stacking, material cascades from the conveyor belt as it changes direction around the distal roller or pulley and through the space between the distal sprocket and the distal roller.

Such apparatus is adapted, therefore, for both stacking bulk material and for reclaiming bulk material. It will be seen that the conveyor belt cooperates with the material-moving rakes for the stacking operation whereby the rakes prevent retrograde movement of the material toward the proximal extremity of the boom during stacking. When the device is utilized for reclaiming, the bulk material rakes engage the sloping side of the pile of material toward the proximal extremity thereof for discharge into a suitable receptacle or conveyor.

THE PROBLEM AND ITS SOLUTION

It has been found that with certain bulk materials, for example those that contain moisture or are by nature sticky, will during utilization of the apparatus for stacking purposes, tend to adhere to the upstanding bulk-material-moving rakes or flights. Upon return of the flights along the lower reach and just prior to reversal of their direction of movement by passage around the tail sprocket at the proximal extremity of the boom, the material may become dislodged or discharged from the flights and the fall inadvertently onto yard conveyor means, for example, disposed below the apparatus. Over a period of time, such accumulation of material by this means is significant and creates a problem of disposal or removal of such material, and the present invention provides means for obviating this difficulty.

To prevent the above condition, a cowling or shroud is provided to enclose at least a portion of the sprocket area and prevent material from being discharged from the apparatus. The cowling or shroud is designed and dimensioned so that the flights carried by the endless chain carry the material around the proximal end of the boom and over the sprocket where it is mixed with material being stacked. A gate or door is designed into the installation and when closed, the gate completes the shroud encirclement preventing spillage of material during the stacking operation. This gate or door is open during reclaiming operation so that material reclaimed is free to be discharged onto the yard belt.

BRIEF STATEMENT OF INVENTION

Briefly stated, the present invention is in a bulk-material-handling apparatus for selectively stacking or reclaiming bulk material. This apparatus includes an elongated boom having proximal and distal extremities, and plurality of spaced material reclaiming flights movable along the upper and lower reaches of the boom. An endless conveyor belt is provided operative between the distal and proximal extremities of the boom for stacking bulk material and is disposed, with respect to its upper reach, in underlying relation to the flights and movable therewith. Separate conveyor means, e.g., a yard belt, are provided in material-receiving relation bulk material and transporting it to a remote location. The proximal extremity of the boom is also provided with means such as a tail sprocket and pulley for reversing the direction of movement of the flights around the proximal extremity and for reversing the direction of movement of the conveyor belt around the extremity of the boom. In such an assembly, the present invention is in the improvement which comprises a shroud or cowling located at the proximal extremity of the boom and having a lower entrance and an upper exit for cooperation with the upper and lower reaches of the boom. Thus, bulk material carried into the shroud or cowling by the flights is confined therein and moved around the proximal end of the boom from the lower reach to the upper reach by the flights. An opening adjacent the lower entrance to the shroud or cowling is disposed above suitable conveyor means, e.g. a truck or a yard belt, and allows for the passage of reclaimed bulk material from the boom to the conveyor. Means are provided which coact between the shroud and the material exit or discharge for selective opening and closing of the opening to control discharge of material onto the separate conveyor.

BRIEF DESCRIPTION OF THE DRAWINGS

In the annexed drawings:

FIG. 3 is a end view of the apparatus shown in FIG. 2.

FIG. 7 is a partial elevation of the proximal extremity of a stacking-reclaiming boom showing another embodiment of the present invention.

FIG. 8 is an end view of the apparatus shown in the FIG. 7.

FIG. 9 is a partial cross-sectional view of the apparatus shown in FIG. 7 as it appears in the plane indicated by the line 9—9 in FIG. 7.

FIG. 10 is a fragmentary cross-sectional view of sealing means as they appear in the plane line 10—10 in FIG. 7.

FIG. 11 is a enlarged detail illustration of sealing means carried by the leading edge of the gate for sealing coaction with a material discharge sill plate.

DETAILED DESCRIPTION OF THE DRAWINGS

First Embodiment

Figure 1:
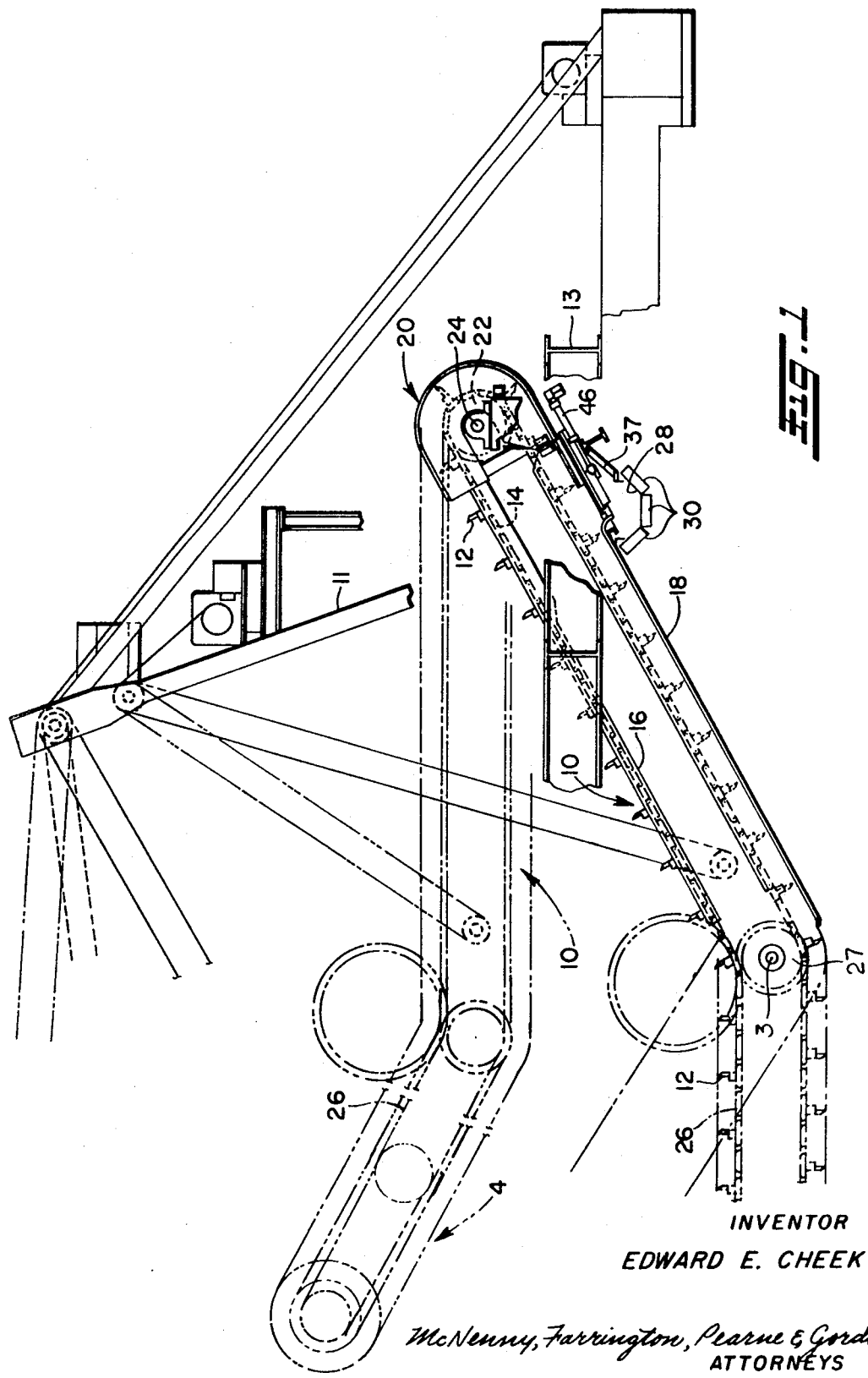
FIG. 1 is a diagrammatic and schematic elevation of a stacker-reclaimer apparatus utilizing an articulated boom and showing an environment for the present invention.

FIG. 1 shows in diagrammatic and schematic form the environment of the present invention including a stacking and reclaiming apparatus having an articulated boom generally indicated at 1 and having a distal extremity 2 and a proximal extremity 20. A point of articulation 3 is provided and divider the boom into a stacking and reclaiming boom portion 4 and a loading and receiving boom portion 10, hereinafter called "return boom portion 10." A suitable frame 11 is mounted on a base frame 13 and carried in turn on conventional wheeled trucks not shown, for movement along suitable rails (not shown). The frame 11 supports ropes and pulleys for elevating the boom portions 4 and 10. The base frame also supports the return boom portion 10 and the drive means for a drive sprocket 22.

Figure 2:
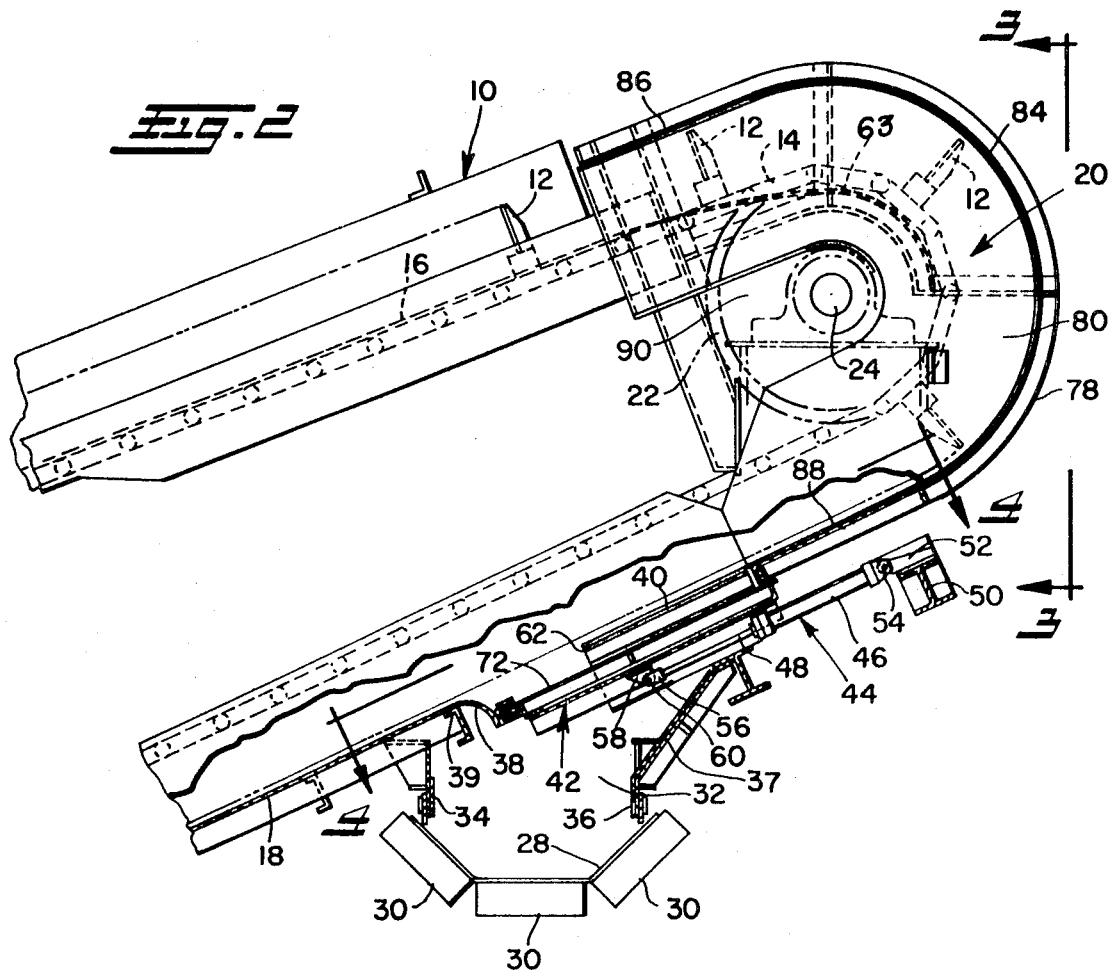
FIG. 2 is a partial elevation of the proximal extremity of a stacking and reclaiming boom showing the bulk-material-reclaiming flights undergoing change of direction around a drive sprocket assembly, and showing a cowling or a shroud in accordance with this invention, a material discharge exit and means for selectively opening and closing the material discharge exit.

Referring now more particularly to the apparatus shown in FIGS. 1-6, like numbers indicating like parts, there is here shown a preferred embodiment of the invention. As shown in FIG. 2, there is provided a return portion of an articulated boom generally indicated at 10 having a plurality of bulk-material-moving flights or rakes 12 mounted at spaced intervals on an endless chain 14, which is one of a pair of laterally spaced chains, for movement outwardly along the upper reach 16 and inwardly along the lower reach 18 of the return boom portion 10. The proximal extremity 20 of the return boom portion 10 is provided with a sprocket indicated by the dotted circle 22 mounted on an axle 24 for changing the direction of movement of the flight-carrying chain 14. In underlying relation to the flights 12 on the boom portion 4 there is provided a conveyor belt 26. Conveyor belt 26 is also disposed around a tail belt pulley 27 mounted on the axle 3. The tail pulley likewise effects a change in the direction of the movement of the conveyor belt 26. The conveyor belt 26 may in some cases have the flights 12 attached directly to the belt in which case separate flight-supporting chain and sprocket means are not employed. A conveyor belt having the flights attached is equivalent in effect and operation to the separate but coacting belt and flight systems herein described. The distal extremity of the boom is shown in dotted lines in FIG. 1—A.

Disposed in underlying material-receiving relation to the proximal end of return boom portion 10 is a separate conveyor belt or yard belt 28 supported on rollers 30 to form a generally V-shaped trough or channel in a known manner. The yard belt 28 receives material discharged from the reclaiming flights 12 through a discharge exit 32 bonded by skirtboards 34 and 46. The skirtboard 36 is conveniently extended diagonally upwardly to provided a sloping chute surface 37 to aid in guiding material into the discharge exit 32.

As indicated above, the return boom portion 10 illustrated in FIG. 2 is normally stationary, and elevation of the remaining boom portion 4 normally occurs at the pivot point 3 intermediate the distal and proximal extremities of the boom (FIG. 1 Accordingly, the disposition of a discharged lip 38 is normally stationary relative to the yard belt 28. The return boom portion 10 may be elevated, if desired. The discharge lip 38 may be a curved steel member or a flexible member from a tough elastomeric substance which serves as a spillway for reclaimed material. In the embodiment shown, the lip 38 is disposed along a beveled lip-supporting member 39. Opposite the discharge lip 38 or spillway 38 there is provided a projecting material-retaining plate 40 spaced from the discharge lip 38 and thus defining an open space for discharge of bulk material from the boom portion 10 and onto the yard belt 28. In order to enable closure of the opening, there is provided a sliding door or gate generally indicated at 42 which is conveniently slidable in a plane parallel to the plane of the plate 40. Movement of the gate 42 is effected by means of an extensible arm generally indicated at 44 and which in the embodiment illustrated includes a hydraulically actuated cylinder 46 and rod 48 movable into and out of cylinder 46 in response to movement of hydraulic fluid under pressure. The extensible arm 44 is attached to the frame 50 by means of a bracket 52 through a pivot 54. The distal extremity 56 of rod 48 is secured to a door bracket 58 through pivot 60. It will be observed, therefore, that the opening between the discharge lip 38 and the marginal edge 62 of the plate 40 may be selectively opened and closed by operation of extensible arm assembly 44. Any suitable actuating or drive mechanism for operating the extensible arm assembly 44 may be used, e.g. electrical, hydraulic, mechanical, or the like. In order to prevent material carried by the flights around plates 84, 86, 88 from falling through the mechanism, there is provided a curved shield or plate 63.

Figure 4:
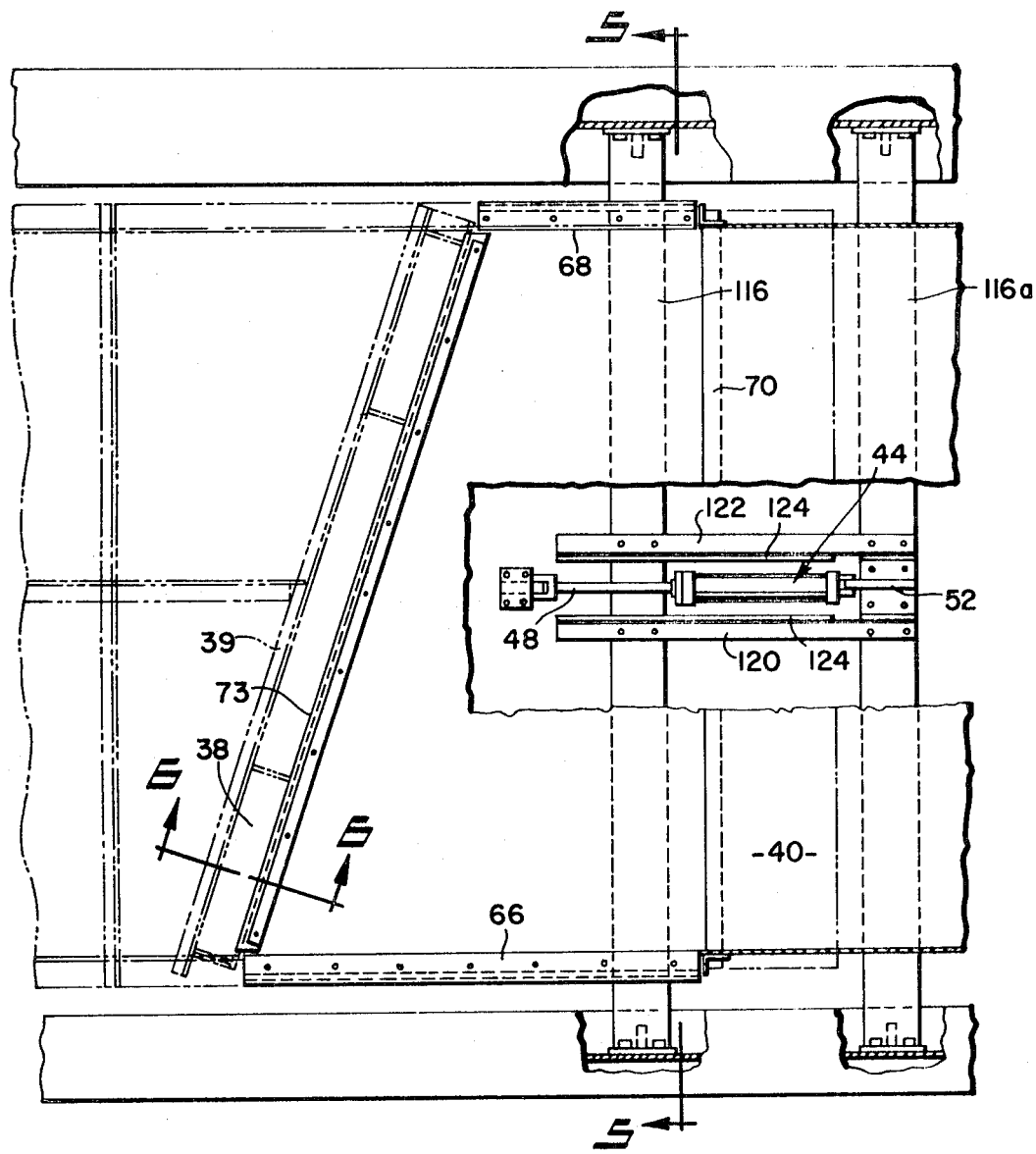
FIG. 4 is a view of the closure gate or door as it appears in the plane indicated by the line 4—4 in FIG. 2.

The moveable gate or door 42 is best shown in FIG. 4 and is composed of a built-up structure having a beveled leading edge 64 parallel side members 66 and 68, and a trailing member 70. The leading edge 64 is beveled for parallel disposition with the lip 38.

Figure 6:
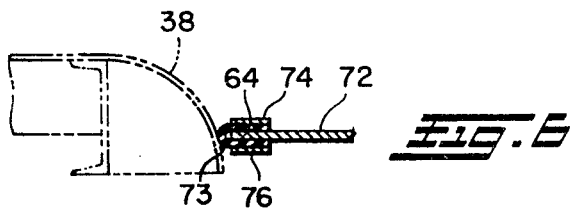
FIG. 6 is a partial cross-sectional view of the leading edge of the door shown in FIG. 4 as it appears in the plane indicated by the line 6—6 in FIG. 4.

As best shown in FIG. 6, the leading edge 64 of the upper plate 72 of the gate assembly 44 is conveniently provided with a rubber bead 73 of generally U-shaped cross-sectional configuration secured to the top and bottom surfaces of the plate 72 by means of retaining plates 74 and 76, respectively. The discharge lip 38 may be formed of metal or, as indicated above, an elastomeric material, and in cooperation with the rubber-beaded leading edge 64 and plate 72 provides and effective seal against the passage of material onto the yard belt 28 during stacking operations.

In order to carry away bulk material which traverses the discharge opening between the lip 38 and the marginal edge 62 of stationary plate 40 on the upper surface of the sliding door 42, there is provided a cowling or shroud generally indicated at 78 and having generally U-shaped sideplates 80 and 82, and a generally U-shaped end closure plate 84 supported between the sideplates 80 and 82 adjacent the outer marginal edges thereof. Suitable frame and reinforcing structural members are provided in a known manner.

The distance between the projecting portions 86 and 88 of the U-shaped end closure plate 84 is sufficient to accommodate without interference the material-moving flights 12, the conveyor belt 26, the chain 14, the sprocket 22 and the tail pulley (not shown). The curved portion of the end closure plate 84 is also dimensioned to accept the radial extension of the flights 12 in their movement around the sprocket 11 in the course of reversing their direction of movement.

The space 90 between the projecting arms of the sideplates 80 and 82 is dimensioned to accommodate the drive shaft or axle 24.

Thus, when the gate or door 42 is closed, material, which in the course of stacking adheres to the flights 12 or is carried by the flights 12 toward the discharge exit or chute 32, is carried past the exit over the plate 40 and around the inner surface of the U-shaped closure plate 84 for recombination with bulk material being stacked.

Figure 5:
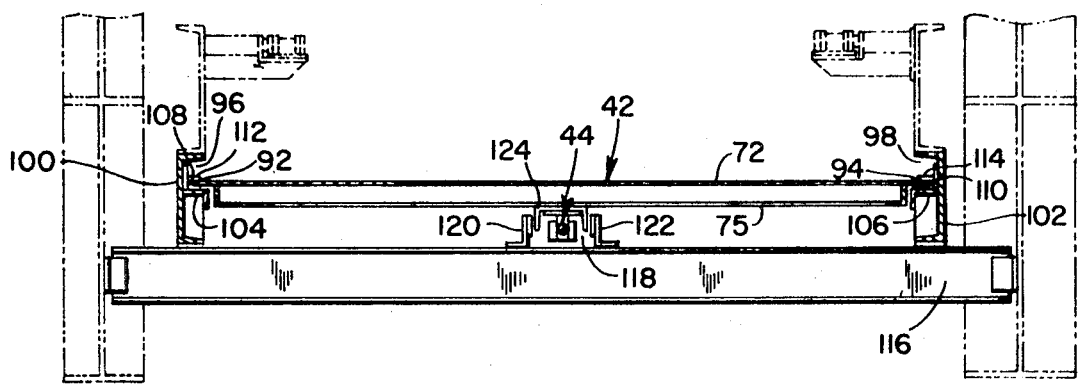
FIG. 5 is a cross-sectional view on an enlarged scale of the gate or door shown in FIG. 4 as it appears in the plane indicated by the line 5—5 in FIG. 4.

With more particular reference to FIG. 5, the gate 42 includes an upper plate 72, lateral extensions 92 and 94 of which are adapted for sliding support in slots 96 and 98, respectively, formed in gate support frame members 100 and 102. Channels 104 and 106 secured in frame members 100 and 102 respectively are provided with wear bars 108 and 110, respectively, on which the lateral extensions 92 and 94 are maintained in sliding contact by L-shaped members 112 and 114, respectively. In operation, the relatively movable surfaces are conveniently run dry, although a lubricant may be used.

Frame members 100 and 102 are conveniently supported on crossheads such as crosshead 116, two of such crossheads being provided as shown in FIG. 4. A suitable guideway 118 is formed by oppositely disposed L-shaped members 120 and 122 extending between crossheads 116 and 116a (FIG. 4). The under panel 75 of the gate 42 is provided with a channel 124 which is guided between members 120 and 122 defining guideway 118. The crosshead 116a provides a fixed support for one end of extensible arm assembly 44.

SECOND EMBODIMENT

In FIGS. 7-11 there is shown another embodiment of the present invention which is suitable to control the unwanted discharge of material from the apparatus onto the yard belt during a stacking operation. In this embodiment, the bulk material flow control apparatus is adapted for installation with a bulk material stacker-reclaimer apparatus wherein the boom pivots about an axis at the proximal extremity of the boom as distinct from the articulated boom embodiment described above. Thus, there is provided in a similar manner a shroud or cowling 136 enclosing a portion of the proximal extremity 138 of a unitary vertically pivotable boom in a stacker-reclaimer apparatus. Inasmuch as the shroud 136 encounters pivotal motion during stacking or during reclaiming, and the discharge exit also varies in response to such rotational movement, a somewhat different gating arrangement is desirable employed. In this embodiment, the shroud 136 is composed of generally J-shaped sideplates 137 and 137a and an end closure plate 139 suitably strengthened by framework in a known manner. To this end there is provided a swinging door assembly generally indicated at 140.

The construction of the shroud or cowling 136 generally is the same as that described in connection with embodiment number one except that the lower projecting arm of the U-shaped sidewalls is cut away to allow for maximum movement of the boom for reclaiming operations, for example. In normal operation, without the shroud 136 or the door 140 present, material is discharged upon reclaiming from the flights 142 by gravity onto sill plate 144 for cascading onto yard belt 146. In order to prevent unwanted discharge of bulk material onto yard belt 146 there is provided the swinging door 140 pivotally secured to side brackets 150 and 152 which are in turn secured to the supporting framework indicated at 154 and 156, respectively. A pivot pin 148 is carried by pillow blocks 158 and 160 for rotation of the door 140 through a limited arc. The swinging-door assembly 140 is composed of sideplates 162 and 162a held in spaced relation by backplate 164. This structure is suitably braced by ribs 166 and 168 together with longitudinal bridging members, for example 170 and 172.

In like manner to the sealing means illustrated in the first embodiment above described, the swinging door of this embodiment is desirably provided with a resilient seal member 174 (FIG. 11) suitably adhered to the leading edge 176 of the swinging door by means of a retainer plate 178, or other suitable structure.

The pivot mounting of the swinging door to the stationary frame members 154 and 156 maintains the swinging door in a relatively fixed position although rotatable about the axis of pivot pin 148. Thus, the boom may be elevated or lowered by pivoting about pivot point 180, and the shroud 136 is carried by and rotated with the boom as it rotates relative to the swinging door 140.

In order to operate the swinging door 140 from a closed or stacking position to an open or reclaiming position, there is provided a projecting rib 182 including an eye portion 184 adapted to receive pivot pin 186 for coaction with a female clevis (not shown) on the distal extremity of a piston rod 188 coacting with a cylinder 190 to form an extensible arm, the opposite end of which is pivotally secured to the frame 192 through pivot pin 194. By operation of the extensible arm in response to hydraulic pressure, for example, the swinging door assembly 140 may be moved from the position shown in solid lines to the open position shown in dotted lines.

Thus, for a reclaiming operation, the gate or swinging door 140 is in its retracted position and material exiting from the proximal extremity 138 of the boom is free to cascade onto sill plate 144 and in turn yard belt 146. During the stacking operation, the swinging door 140 is actuated into its closed position as shown in solid lines in FIG. 7. The elastomeric sealing strip 174 coacts in this position with sill plate 144 to form a seal whereby material which would otherwise be discharged to the yard belt is accumulated in the region indicated by the dotted crosshatching (FIG. 7) until a sufficient supply is present and the flights 142 carry any excess around the end of the boom for releasing with material being stacked.

Referring now to FIG. 9, there is here shown a fragmentary cross section taken in the plane indicated by the line 9—9 in FIG. 7 showing the relative disposition of the flights 142, the sprocket 196, the flight-carrying chain 198, and the shroud 136.

FIG. 10 shows suitable side-sealing means for coacting between the sideplates such as sideplate 137a and the sideplate 162a of the swinging door assembly 140. There is provided a retaining bracket 200 suitably secured to the sideplate 137a as by welding. The bracket 200 has an L-shaped cross section and carries thereon a laterally extending elastomeric sealing member 202 secured to the laterally extending arm of the retaining bracket 200 by means of a retaining plate 204. Thus, a seal may be maintained between the relatively movable sidewalls 137a and 162a.

What is claimed is:

1. In a bulk-material-handling apparatus for selectively stacking and reclaiming bulk material, said apparatus including an elongated boom having proximal and distal extremities, a plurality of spaced material-reclaiming flights movable along the upper and lower reaches of said boom, an endless conveyor belt operative between the distal and proximal extremities of the boom for stacking bulk material and disposed in underlying relation to said flights along the upper reach of said boom and movable therewith, separate conveyor means in material-receiving relation to the proximal extremity of said boom for receiving reclaimed bulk material therefrom, means for reversing the direction of movement of the flights around the proximal extremity of said boom, the improvement which comprises:

a. a shroud having a lower entrance and an upper exit and spaced sideplates for enclosing the proximal extremity of said boom whereby bulk material carried into the shroud by the flights is confined therein and moved around the proximal end from the lower reach to the upper reach of the boom by said flights, b. an opening adjacent the lower entrance to said shroud and disposed above said separate conveyor means for passage of reclaimed bulk material from said boom to said separate conveyor means, c. a sill plate underlying the opening for deflecting bulk material passing through the opening onto said separate conveyor means, and d. means coacting between said shroud and said sill plate for selectively opening and closing said opening to control discharge of material onto said separate conveyor including a door swingable about a horizontal hinge axis between an open position and the closed position against said sill plate, said door including a pair of sideplates maintained in spaced relation by a backplate. and when in the closed position defining with said sill plate a material-confining receptacle.

2. A bulk-material-handling apparatus in accordance with claim 1, wherein the swingable door includes a leading edge adapted for closing coaction with the face of said sill plate.

3. A bulk-material-handling apparatus in accordance with claim 2, wherein the leading edge of said door includes a resilient sealing strip secured thereto.

4. A bulk-material-handling apparatus in accordance with claim 1, wherein the swingable door includes an extensible arm operative to open and close the door.

5. A bulk-material-handling apparatus in accordance with claim 4 wherein the extensible arm is hydraulically actuated.

* * * * *

UNITED STATES PATENT OFFICE
CERTIFICATE OF CORRECTION

Patent No. 3,620,350      Dated November 16, 1971

Inventor(s) Edward E. Cheek

It is certified that error appears in the above-identified patent and that said Letters Patent are hereby corrected as shown below:

Column 1, Line 6, after the word "material" insert -- and of reclaiming bulk material --.

Column 1, Line 8, change "ranking" to -- raking --.

Column 1, Line 10, after "at" insert -- each --.

Column 1, Line 33, after "material" insert -- along the lower reach of the boom and drag material --.

Column 1, Line 46, delete "the" before the word "fall"

Column 1, Line 70, insert -- a -- before the word "plurality".

Column 2, Line 1, after "relation" insert -- to the proximal extremity of the boom for receiving reclaimed --.

Column 2, Line 66, change "divider" to -- divides --.

Column 4, Line 8, change the word "and" (second occurrence) to -- an --.

Column 4, Line 26, change "11" to -- 22 --.

Column 5, Line 53, insert -- onto -- after the word "turn".

Signed and sealed this 23rd day of May 1972.

(SEAL)
Attest:

EDWARD M. FLETCHER, JR.          ROBERT GOTTSCHALK
Attesting Officer                Commissioner of Patents